United States Patent
Kusumoto et al.

(10) Patent No.: US 6,715,199 B2
(45) Date of Patent: Apr. 6, 2004

(54) METHOD OF MANUFACTURING DYNAMO-ELECTRIC MACHINE WITH LAMINATED WINDING

(75) Inventors: Katsuhiko Kusumoto, Tokyo (JP); Keiichi Komurasaki, Tokyo (JP); Yuji Nakahara, Tokyo (JP); Hiroyuki Akita, Tokyo (JP); Kazuhiro Odawara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,699

(22) Filed: Nov. 20, 2001

(65) Prior Publication Data

US 2002/0047475 A1 Apr. 25, 2002

Related U.S. Application Data

(62) Division of application No. 09/572,915, filed on May 17, 2000.

(30) Foreign Application Priority Data

Nov. 12, 1999 (JP) ............................................. 11-322665

(51) Int. Cl.⁷ ........................ H02K 15/00; H02K 15/14; H02K 15/16
(52) U.S. Cl. ............................. 29/596; 29/598; 29/606; 29/609; 310/71; 310/201; 310/207
(58) Field of Search ........................ 29/596, 598, 606, 29/609; 310/71, 201, 207

(56) References Cited

U.S. PATENT DOCUMENTS

| | | | |
|---|---|---|---|
| 2,278,139 A | 3/1942 | Puchy | 310/254 |
| 2,407,935 A | 9/1946 | Perfeti et al. | 310/201 |
| 3,809,938 A | 5/1974 | Sjoberg et al. | 310/254 |
| 3,914,859 A | * 10/1975 | Pierson | 29/596 |
| 4,319,152 A | 3/1982 | Van Gils et al. | |
| 4,398,112 A | * 8/1983 | van Gils | 310/201 |
| 5,331,244 A | 7/1994 | Rabe | 310/180 |
| 5,422,526 A | 6/1995 | Kawabata et al. | |
| 5,493,162 A | 2/1996 | Wuerth et al. | 310/218 |
| 5,568,000 A | 10/1996 | Hanneken | 310/254 |
| 5,570,503 A | * 11/1996 | Stokes | 29/596 |
| 5,729,071 A | 3/1998 | Steiner | 310/254 |
| 5,955,810 A | 9/1999 | Umeda et al. | 310/208 |
| 5,998,903 A | 12/1999 | Umeda et al. | 310/179 |
| 6,124,660 A | 9/2000 | Umeda et al. | 310/215 |
| 6,198,190 B1 | 3/2001 | Umeda et al. | 310/179 |
| 6,304,018 B1 | * 10/2001 | Ham et al. | 310/216 |

FOREIGN PATENT DOCUMENTS

| | | |
|---|---|---|
| DE | 44 11 749 A1 | 10/1995 |
| DE | 44 27 323 A1 | 2/1996 |
| DE | 196 32 390 A1 | 2/1998 |
| EP | 0 878 893 A1 | 11/1998 |
| JP | 62-272836 | 11/1987 |
| JP | 1-148047 | 6/1989 |
| WO | 94 18741 A1 | 8/1994 |

\* cited by examiner

Primary Examiner—Carl J. Arbes
Assistant Examiner—Tim Phan
(74) Attorney, Agent, or Firm—Sughrue Mion, PLLC

(57) ABSTRACT

In a stator for a dynamo-electric machine, a winding includes a conductor having a rectangular cross-sectional shape in a direction perpendicular to an axial direction, an overall shape of the conductor being a crank shape when flattened out, and the conductor includes straight portions laminated within slots, and bridge portions connecting the straight portions to each other, the bridge portions protruding from both end surfaces of the stator core in the axial direction.

1 Claim, 16 Drawing Sheets

METHOD OF MANUFACTURING DYNAMO-ELECTRIC MACHINE WITH LAMINATED WINDING

This is a divisional of application Ser. No. 09/572,915 filed May 17, 2000, the disclosure of which is incorporated herein by reference.

BACKGROUND OF THE INVENTION

1. Field of the Invention

The present invention relates to a stator for a dynamo-electric machine constructed by laminating steel plate, the stator including a stator core formed with slots which extend in the axial direction and are spaced in the circumferential direction, and relates to a method for the manufacture thereof.

2. Description of the Related Art

FIG. 25 is a partial cross section of a conventional stator for a dynamo-electric machine. A stator core 1 constructed by laminating silicon steel plate is formed with slots 2 which extend in an axial direction and are spaced in a circumferential direction. A winding is formed by winding a conductor 3 composed of a copper wire conductor main body coated with enamel into the slots 2, which have an epoxy resin insulation coating 4 on an inner wall surface. Wedge 5 are disposed in entrance portions of the slots 2 to prevent the winding from protruding radially inwards from the slots 2.

In a stator for a dynamo-electric machine of the above construction, the cross-sectional shape of the conductor 3 is circular and spaces exist between adjacent conductors 3, lowering the space factor (the ratio of the space occupied by the conductors 3 in the slot 2). The diameter of the conductor 3 can be made thinner in order to increase the space factor of the conductor 3, but the number of winds of the conductor 3 increases proportionately, reducing productivity and the mechanical strength of the conductor 3 is also lowered, increasing the likelihood of breakages. Thus, one problem has been that the limit to improvement of the space factor of the conductor 3 has been about 40 to 50 percent and it has not been possible to raise the space factor beyond that.

SUMMARY OF THE INVENTION

The present invention aims to solve the above problems and an object of the present invention is to provide a stator for a dynamo-electric machine having improved manufacturing performance and enabling the space factor of the conductor to be raised, and to provide a method for the manufacture thereof.

To this end, according to the present invention, there is provided a stator for a dynamo-electric machine comprising a winding including a conductor having a rectangular cross-sectional shape in a direction perpendicular to an axial direction, an overall shape of the conductor being a crank shape when flattened out, the conductor comprising: straight portions laminated within slots; and bridge portions connecting the straight portions to each other, the bridge portions protruding from both end surfaces of the stator core in the axial direction.

According to another aspect of the present invention, there is provided a method for manufacturing a stator for a dynamo-electric machine, the method comprising: a step of joining the teeth into an annular shape by engaging the wedges in the entrance portions of the slots; a step of installing in the teeth a block-shaped winding formed by lamination by winding the conductor for a number of laps; and a step of engaging the engaging portions of the teeth in the engaged portions of the core back.

According to still another aspect of the present invention, there is provided a method for manufacturing a stator for a dynamo-electric machine, the method comprising: a step of installing in the teeth a block-shaped winding formed by lamination by winding the conductor for a number of laps, the teeth being joined in advance into an annular shape by means of a thin connecting portion at a radially inner portion; a step of engaging the engaging portions of the teeth in the engaged portions of the core back; and a step of cutting the connecting portions.

BRIEF DESCRIPTION OF THE DRAWINGS

FIG. 6 (B) is a cross section taken through line X—X in FIG. 6 (A);

FIG. 6 (C) is a cross section taken through line Y—Y in FIG. 6 (A);

FIG. 8 (B) is a view of FIG. 8 (A) from the direction of the arrow Q;

DETAILED DESCRIPTION OF THE PREFERRED EMBODIMENTS

Embodiment 1

Figure 1:
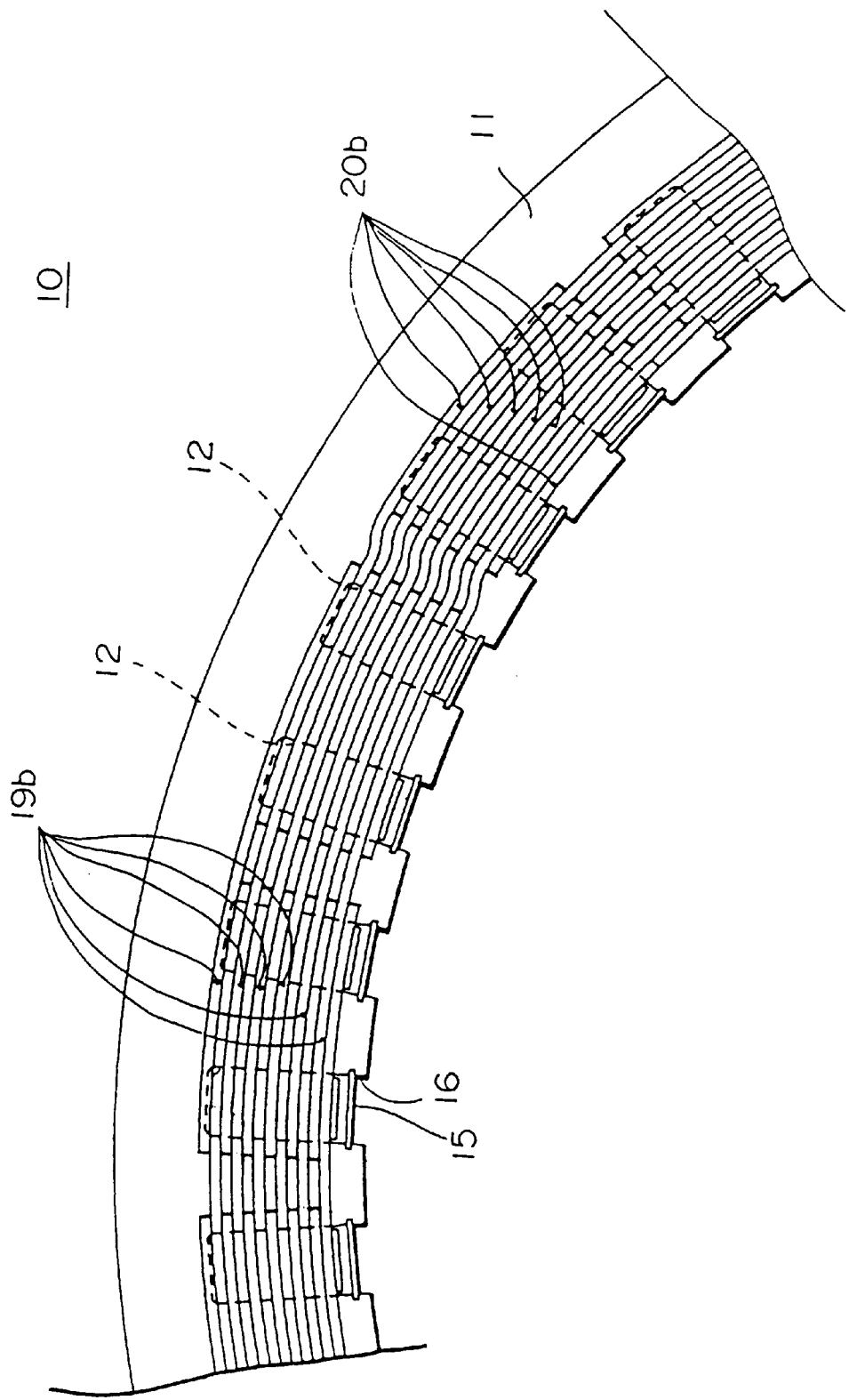
FIG. 1 is a partial end elevation of a stator for a dynamo-electric machine according to Embodiment 1 of the present invention.
Figure 2:
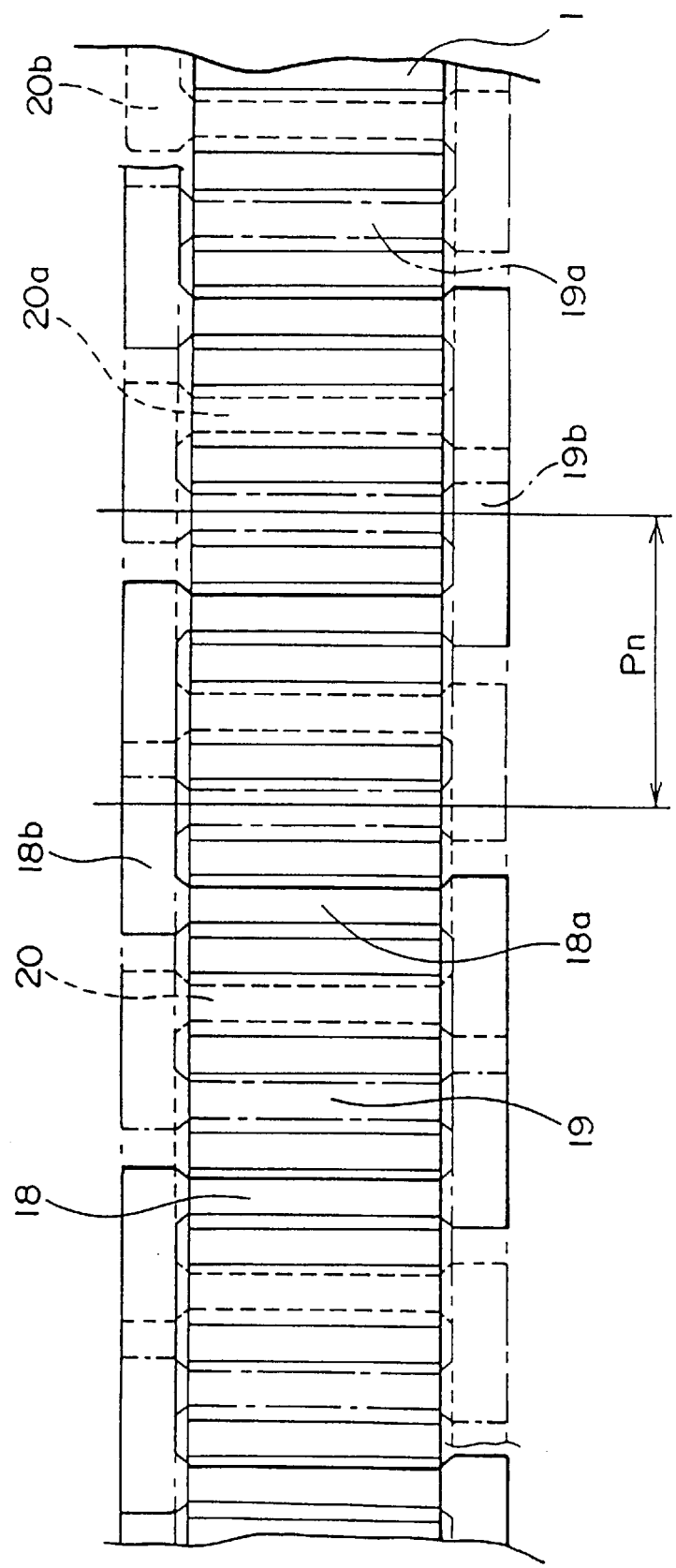
FIG. 2 is a developed projection of the winding in FIG. 1.
Figure 3:
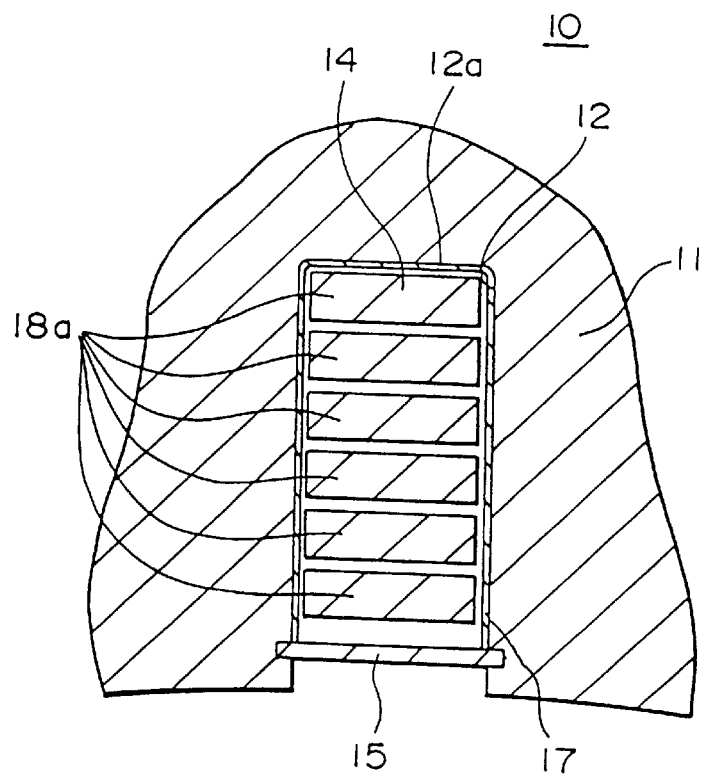
FIG. 3 is a partial cross section taken perpendicular to an axis of the stator in FIG. 1.
Figure 4:
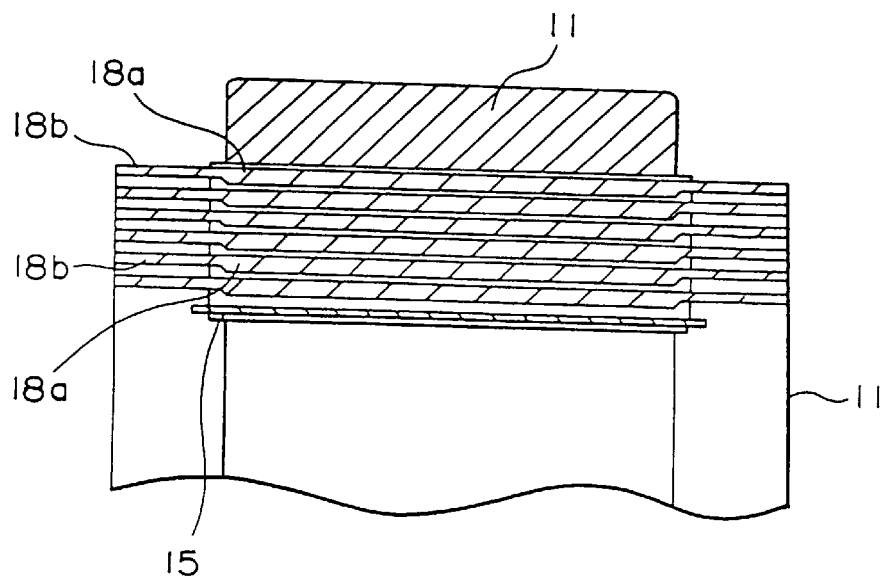
FIG. 4 is a partial cross section taken along the axis of the stator in FIG. 1.

FIG. 1 is a partial end elevation of a stator for a dynamo-electric machine according to Embodiment 1 of the present invention, FIG. 2 is a developed projection of the winding in FIG. 1, FIG. 3 is a partial cross section taken perpendicular to an axis of the stator in FIG. 1, and FIG. 4 is a partial cross section taken along the axis of the stator in FIG. 1.

This stator for a dynamo-electric machine 10 includes:

a stator core 11 constructed by laminating silicon steel plate, the stator core being formed with slots 12 which extend in an axial direction and are spaced in a circumferential direction;

a winding disposed in the slots 12;

an epoxy resin insulation portion formed on an inner wall surface of the slots 12; and wedges 15 secured in entrance portions 16 of the slots 12 to prevent the winding 14 from protruding radially inwards from the slots 12.

Figure 5:
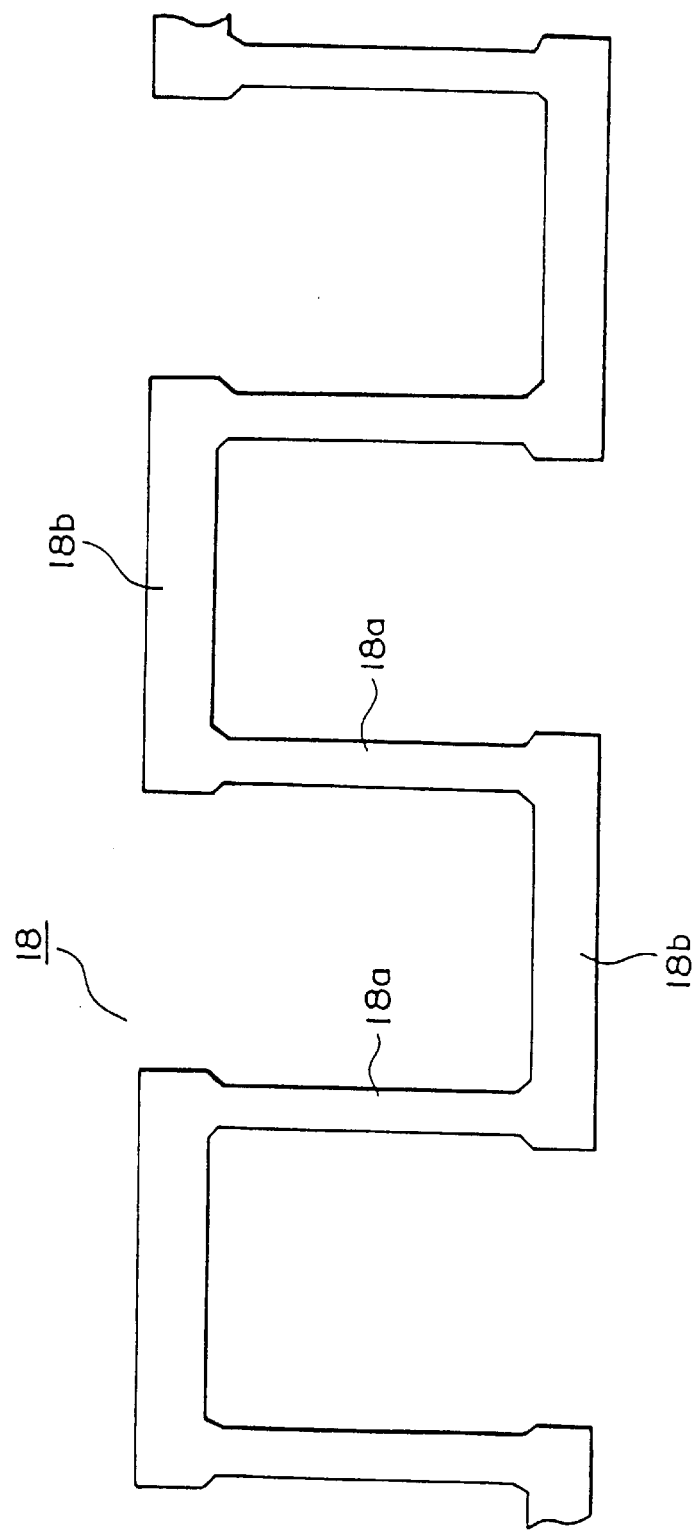
FIG. 5 is a front elevation of the U-phase conductor in FIG. 1.

The winding 14 comprises a U-phase conductor 18 (solid line in FIG. 2), a V-phase conductor 19 (dashed chain line in FIG. 2), and a W-phase conductor 20 (dashed line). As shown in FIG. 5, each phase of conductor 18, 19, and 20 has a copper conductor main body surface-coated with enamel, and each zigzags in a crank shape. The U-phase conductor 18, which has a rectangular cross section and is wound for a number of laps, comprises straight portions 18a laminated within the slots 12, and bridge portions 18b, which connect the straight portions 18a to each other and protrude axially from both end surfaces of the stator core 11. Like the U-phase conductor 18, the V-phase conductor 19 also comprises straight portions 19a laminated within the slots 12, and bridge portions 19b, which connect the straight portions 19a to each other and protrude axially from both end surfaces of stator core 11. The W-phase conductor 20 also comprises straight portions 18a laminated within the slots 12, and bridge portions 20b, which connect the straight portions 20a to each other and protrude axially from both end surfaces of stator core 11.

In this embodiment, each phase of conductor 18, 19, and 20 is wound for six laps and the distance between adjacent straight portions 18a, 19a, and 20a of the same phase in each of the 6 layers increases the further radially outwards the layers are positioned in the stator core 11. For that reason, the relationship between a pitch Pn between adjacent straight portions 18a, 19a, and 20a of the same phase in an nth lap and a pitch Pn+1 in an (n+1)th lap is Pn<Pn+1, so that each of the straight portions 18a, 19a, and 20a of each phase of conductor 18, 19, and 20 fits smoothly within the slots 12.

Figure 6:
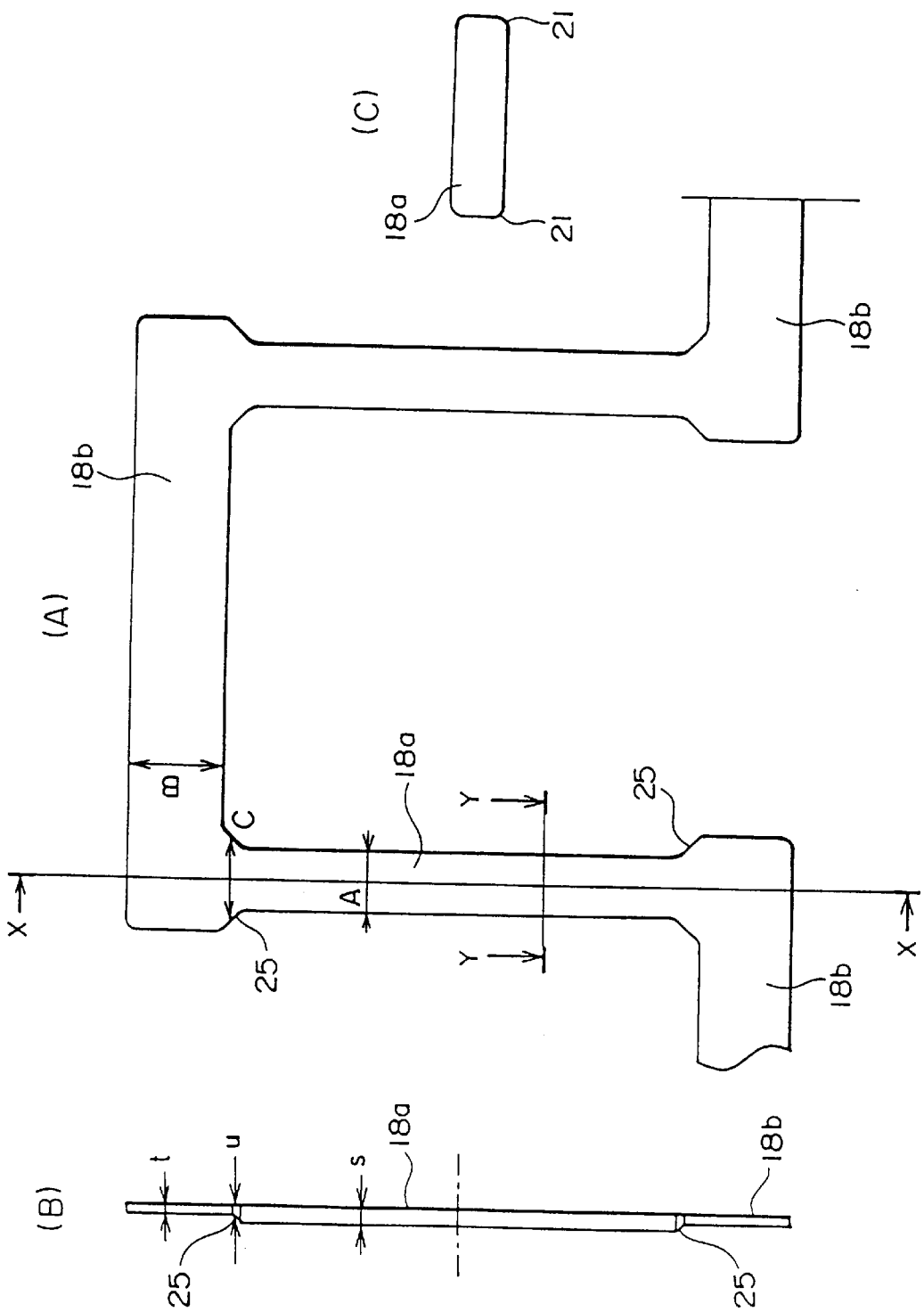
FIG. 6 (A) is a partial front elevation of a conductor.

FIG. 6 (A) is a partial enlargement of the U-phase conductor 18 in FIG. 5, FIG. 6 (B) is a cross section taken through line X—X in FIG. 6 (A), and FIG. 6 (C) is a cross section taken through line Y—Y in FIG. 6 (A).

When A is a width dimension and s a thickness dimension of the straight portion 18a of the U-phase conductor, B is a width dimension and t a thickness dimension of the bridge portion 18b, and C is a width dimension and u a thickness dimension of a tapered portion 25 of varying cross-section being a connecting portion between the straight portion 18a and the bridge portion 18b, the relationships $A \times s \approx B \times t$, $C \times u \geq A \times s$, and $C \times u \geq B \times t$ are satisfied. These relationships are similarly satisfied in the V-phase conductor 19 and the W-phase conductor 20.

As can be seen from FIG. 2, since each layer of the bridge portion 18b, 19b, and 20b of each phase of conductor 18, 19, and 20 overlaps the bridge portions 18b, 19b, and 20b of the other phases at both ends of the stator core 11, the thickness of the bridge portions 18b, 19b, and 20b must be thinner than the thickness of the straight portions 18a, 19a, and 20a, as shown in FIG. 4. At the same time, the width dimension B of the bridge portions 18b, 19b, and 20b is designed to be larger than the width dimension A of the straight portions 18a, 19a, and 20a so that the cross-sectional area of the bridge portions 18b, 19b, and 20b is substantially the same as the cross-sectional area of the straight portions 18a, 19a, and 20a. In this manner, generation of heat due to discontinuities in cross-sectional shape between the straight portions 18a, 19a, and 20a and the bridge portions 18b, 19b, and 20b is suppressed.

Furthermore, because $C \times u \geq A \times s$ and $C \times u \geq B \times t$ are satisfied, the cross-sectional area of the tapered portions 25, which are connecting portions between the straight portions 18a, 19a, and 20a and the bridge portions 18b, 19b, and 20b, is the same as or greater than the cross-sectional area of the straight portions 18a, 19a, and 20a and the cross-sectional area of the bridge portions 18b, 19b, and 20b, suppressing increases in copper loss in the tapered portions 25, which are localities where the cross-sectional shape is different form that of the straight portions 18a, 19a, and 20a and the bridge portions 18b, 19b, and 20b.

The straight portions 18a, 19a, and 20a installed in the slots 12 have a rectangular cross section, allowing the straight portions 18a, 19a, and 20a to be installed satisfactorily in the slots 12, which have a flat bottom surface 12a. As shown in FIG. 2, the U-phase conductor 18, the V-phase conductor 19, and the W-phase conductor 20 are disposed at an electrical angular pitch of 120° from each other, and by winding them for a number of laps to form a lamination then installing them into the stator core 11 simultaneously, installation is improved compared to when the U-phase conductor 18, the V-phase conductor 19, and the W-phase conductor 20 are installed separately.

Furthermore, because curved surface portions 21 are formed on the four corners of the cross section of the straight portions 18a, 19a, and 20a as shown in FIG. 6 (C), the U-phase conductor 18, the V-phase conductor 19, and the W-phase conductor 20 can be smoothly installed without the insulation portions 17 being chipped during insertion of the conductors into the slots 12, further improving installation. Moreover, the curved surface portions may also be disposed on one corner only, or more.

Embodiment 2

Figure 7:
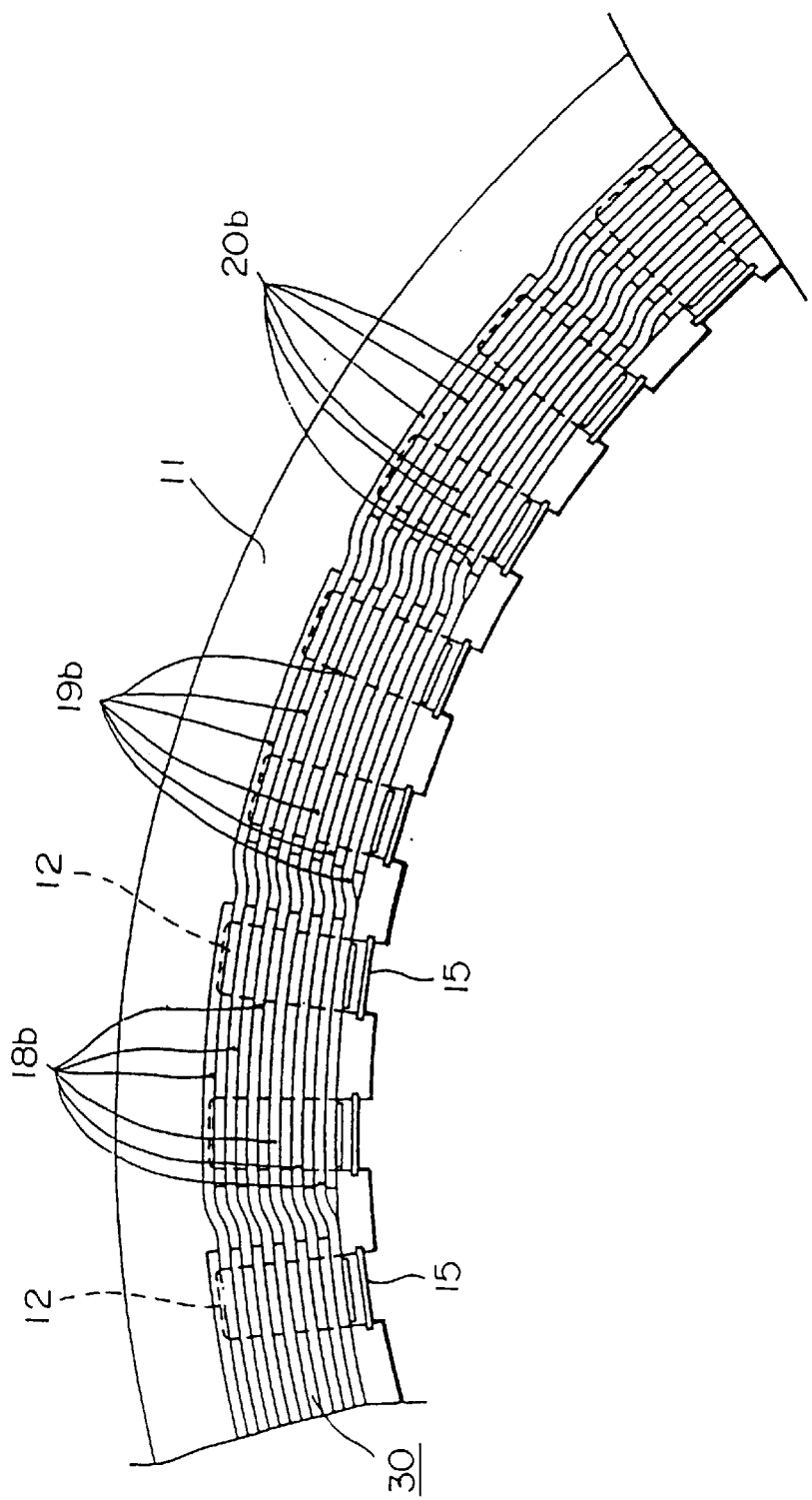
FIG. 7 is a partial end elevation of a stator for a dynamo-electric machine according to Embodiment 2 of the present invention.
Figure 8:
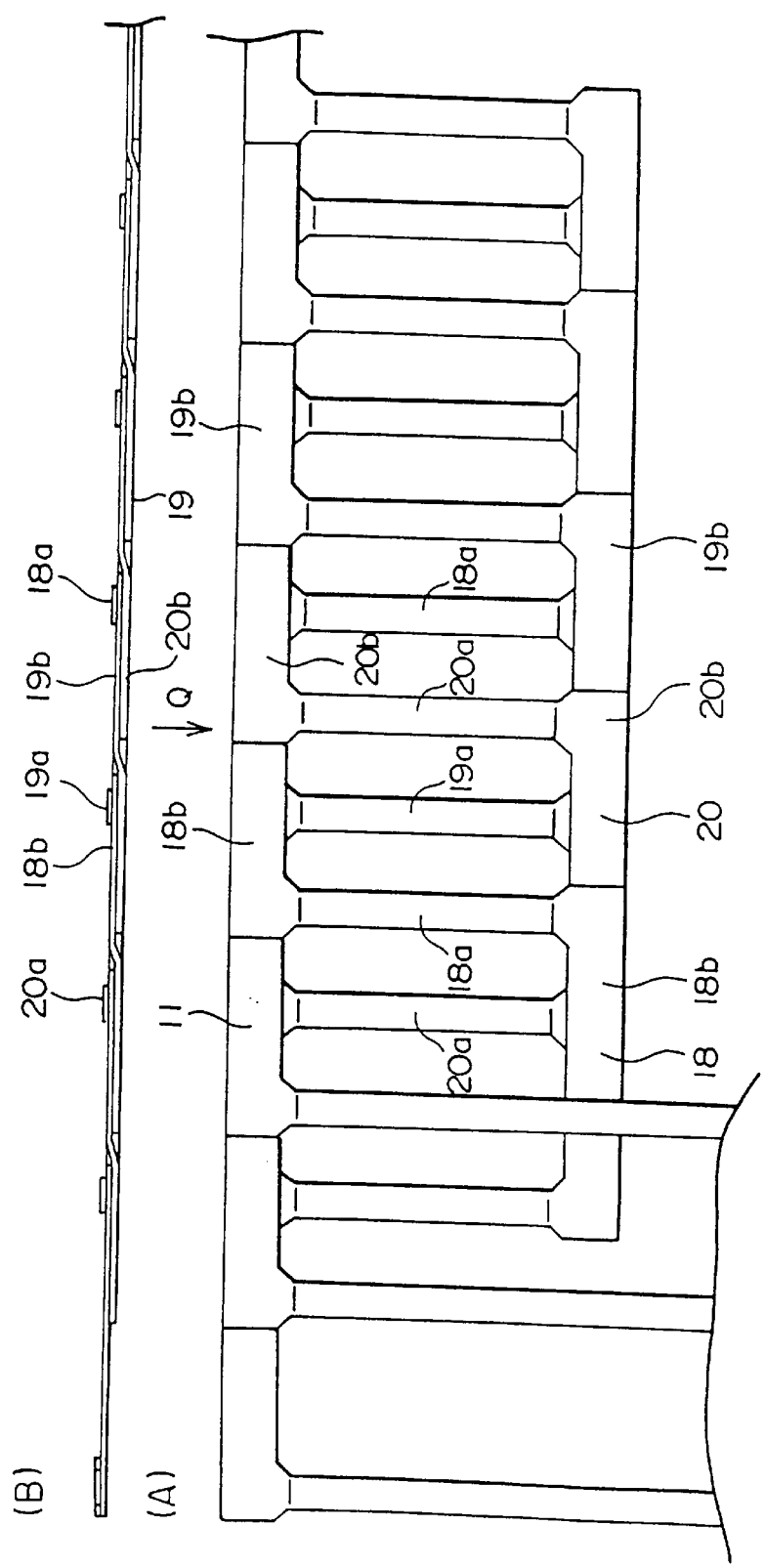
FIG. 8 (A) is developed projection of the winding of the dynamo-electric machine in FIG. 7.

FIG. 7 is a partial end elevation of a stator for a dynamo-electric machine according to Embodiment 2 of the present invention, FIG. 8 (A) is developed projection of the U-phase conductor 18, the V-phase conductor 19, and the W-phase conductor 20 of the dynamo-electric machine in FIG. 7, and FIG. 8 (B) is a view of FIG. 8 (A) from the direction of the arrow Q.

In Embodiment 2, a winding 30 is the same as the winding 14 of Embodiment 1 in that the U-phase conductor 18, the V-phase conductor 19, and the W-phase conductor 20 are laminated so as to be disposed at an electrical angular pitch of 120° from each other, but differs in that the phases of conductor 18, 19, and 20 are laminated so as to be interwoven. In other words, when bridge portions 18b, 19b, and 20b of the U-phase conductor 18, the V-phase conductor 19, and the W-phase conductor 20 are laminated such that the bridge portion 18b is the bottom layer, the bridge portion 19b is the middle layer, and the bridge portion 20b is the top layer at one location, adjacent bridge portions 18b, 19b, and 20b which are connected to the above bridge portions 18b, 19b, and 20b by straight portions 18a, 19a, and 20a are laminated such that the bridge portion 18b is the top layer, the bridge portion 19b is the middle layer, and the bridge portion 20b is the bottom layer, and adjacent bridge portions 18b, 19b, and 20b which are connected to those bridge portions 18b, 19b, and 20b by straight portions 18a, 19a, and 20a are laminated such that the bridge portion 18b is the bottom layer, the bridge portion 19b is the middle layer, and the bridge portion 20b is the top layer. By making the layer positioning different between the bridge portions 18b, 19b, and 20b of the U-phase conductor 18, the V-phase conductor 19, and the W-phase conductor 20 and the adjacent bridge portions 18b, 19b, and 20b of the U-phase conductor 18, the V-phase conductor 19, and the W-phase conductor 20, the positions of the straight portions 18a, 19a, and 20a within the slots 12 can be changed to make the inductance around the straight portions 18a, 19a, and 20a different, averaging out variations in resistance values due to skin effect over the total length of the U-phase conductor 18, the V-phase conductor 19, and the W-phase conductor 20.

Moreover, Embodiment 2 is the same as Embodiment 1 in that the relationship between the pitch Pn between adjacent straight portions 18a, 19a, and 20a of the same phase in the nth lap and the pitch Pn+1 in the (n+1)th lap is Pn<Pn+1, so that each of the straight portions 18a, 19a, and 20a of each phase of conductor 18, 19, and 20 fits smoothly within the slots 12.

Furthermore, the positions where the straight portions 18a, 19a, and 20a are extended on the left-hand side of FIG. 8 are lead wire portions of the U-phase conductor 18, the V-phase conductor 19, and the W-phase conductor 20.

Embodiment 3

Figure 9:
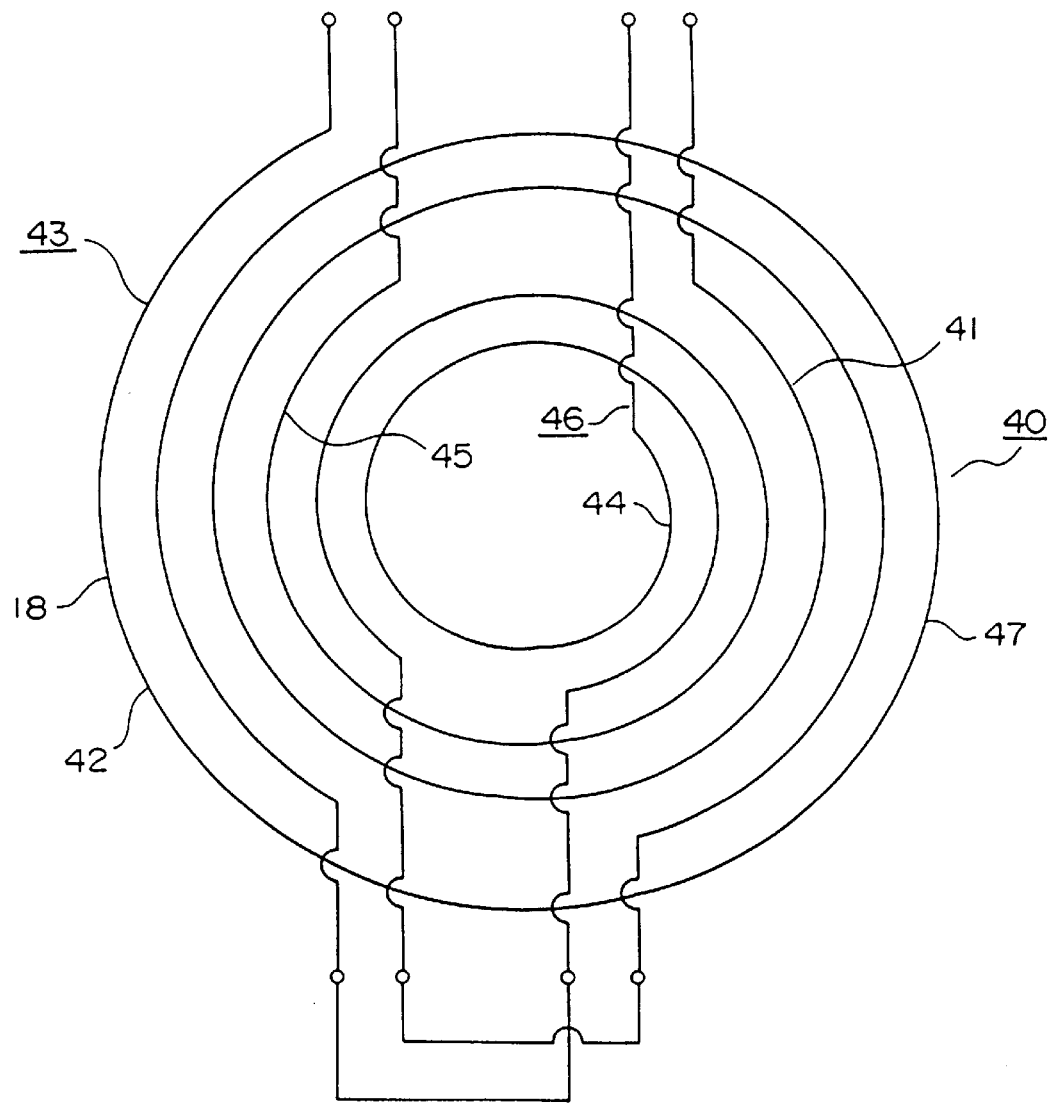
FIG. 9 is an electric circuit diagram for a winding for a dynamo-electric machine according to Embodiment 3 of the present invention.

FIG. 9 is an electric circuit diagram for the U-phase conductor 18 of a winding 40 of a dynamo-electric machine according to Embodiment 3 of the present invention. Since the U-phase conductor 18, the V-phase conductor 19, and the W-phase conductor 20 all have the same construction, only a U-phase winding portion 47 which is constructed by winding the U-phase conductor 18 will be explained here.

In Embodiment 3, the U-phase winding portion 47 includes a first parallel circuit 43 composed of an inner coil 41 and an outer coil 42 radially outside the inner coil, each formed by winding the U-phase conductor 18 a predetermined number of times, and a second parallel circuit 46 composed of an inner coil 44 and an outer coil 45 radially outside the inner coil, each formed by winding the U-phase conductor 18 a predetermined number of times. The inner coil 41 of the first parallel circuit 43 and the outer coil 45 of the second parallel circuit 46 are connected in series, and the outer coil 42 of the first parallel circuit 43 and the inner coil 44 of the second parallel circuit 46 are connected in series.

The winding 40 comprises the U-phase winding portion 47, and a V-phase winding portion and W-phase winding portion having the same construction as the U-phase winding portion 47, averaging out variations in resistance values due to skin effect over the total length of the U-phase conductor 18, the V-phase conductor 19, and the W-phase conductor 20.

Embodiment 4

Figure 10:
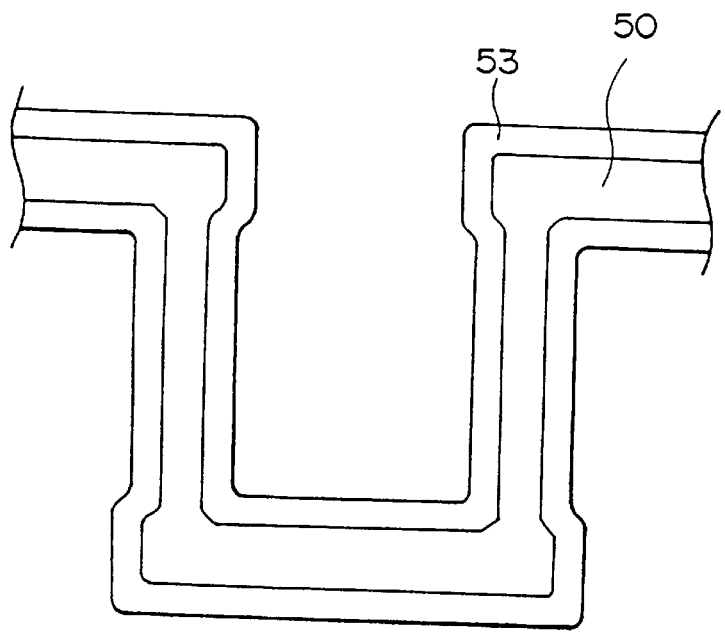
FIG. 10 is partial front elevation of a conductor for a dynamo-electric machine according to Embodiment 4 of the present invention.
Figure 11:
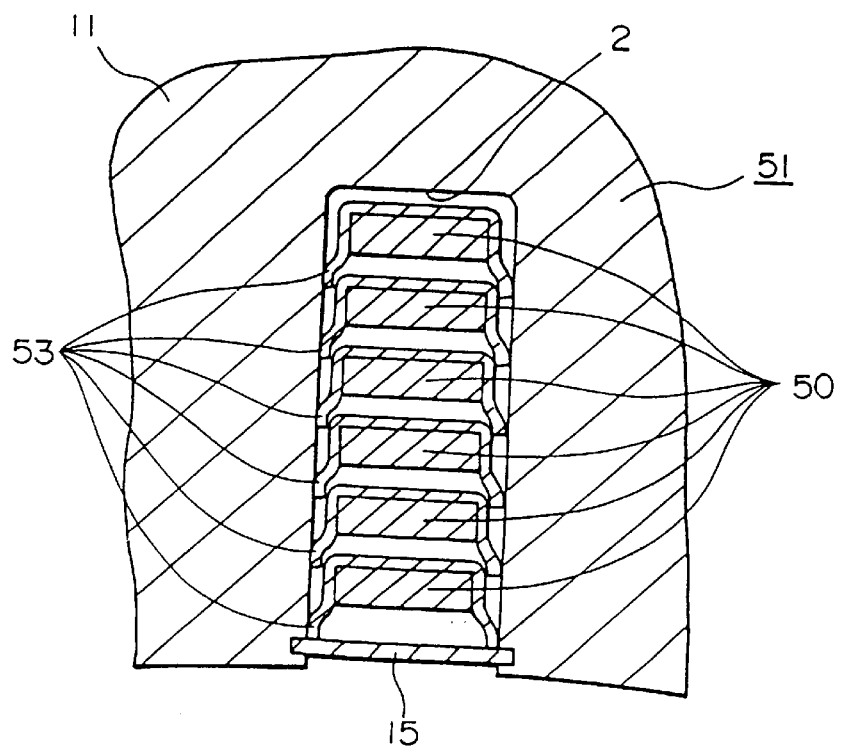
FIG. 11 is a partial cross section of a stator when the conductor in FIG. 10 is mounted in the slots thereof.

FIG. 10 is partial front elevation of a U-phase conductor 50 for a dynamo-electric machine according to Embodiment 4 of the present invention, and FIG. 11 is a partial cross section of a stator 51 when the U-phase conductor 50 in FIG. 10 is mounted in the slots 2 thereof. Moreover, since the U-phase conductor 50, a V-phase conductor and a W-phase conductor all have the same construction, only the U-phase conductor 50 will be explained here.

In this embodiment, three surfaces of the U-phase conductor 50 are covered by an insulation sheet 53. This U-phase conductor 50 is mounted in the slots 2 as shown in FIG. 11 and insulation between the conductor 50 and the stator core 11 is ensured by this insulation sheet 53, eliminating the need for the insulation portions 17 used in Embodiment 1.

Moreover, the enamel coating may also be removed from the surface of the conductors in this embodiment.

Embodiment 5

Figure 12:
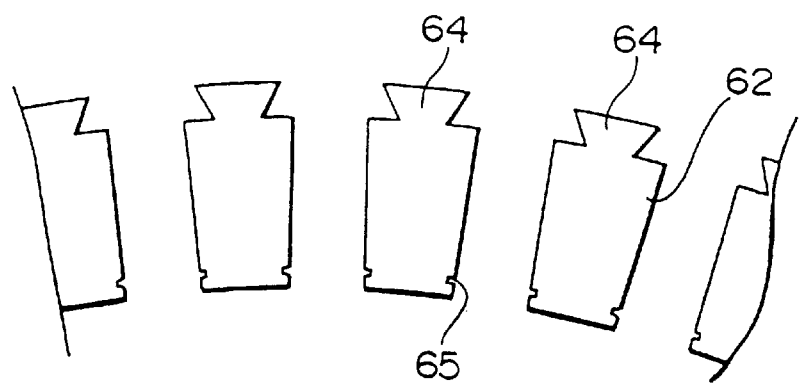
FIG. 12 is a view of an intermediate step in the manufacture of a stator for a dynamo-electric machine according to Embodiment 5 of the present invention.
Figure 13:
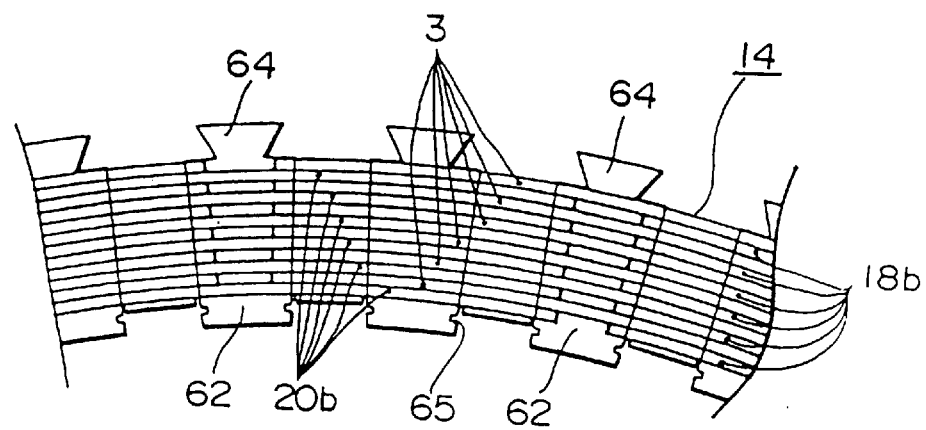
FIG. 13 is a view of an intermediate step in the manufacture of a stator for a dynamo-electric machine according to Embodiment 5 of the present invention.
Figure 14:
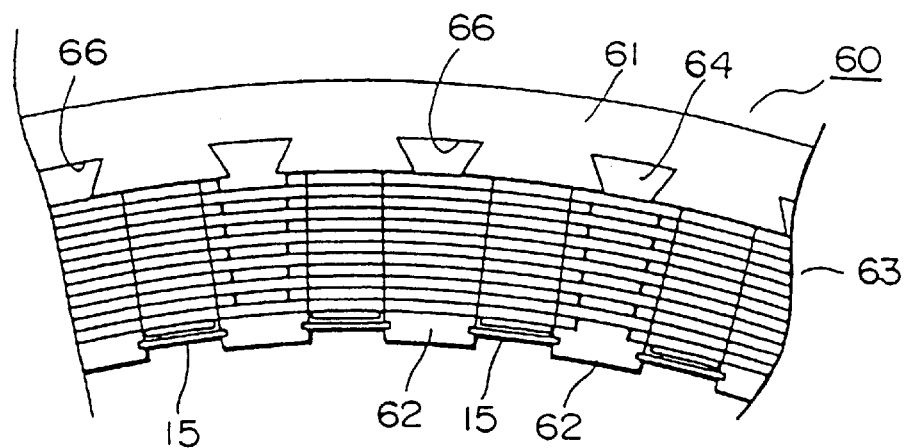
FIG. 14 is a partial end elevation of a stator for a dynamo-electric machine according to Embodiment 5 of the present invention.

FIGS. 12 to 14 are views of steps in the manufacture of a stator for a dynamo-electric machine according to Embodiment 5 of the present invention.

The stator 60 for a dynamo-electric machine according to Embodiment 5 includes stator core 63 capable of being separated into a core back 61 and teeth 62. A dovetailed engaging portion 64 and wedge engaging portions 65 for engaging the wedges 15 are formed in each of the teeth 62. Engaged portions 66 for receiving the engaging portions 64 of the teeth 62 are formed in the core back 61.

In this embodiment, the U-phase conductor 18, the V-phase conductor 19, and the W-phase conductor 20 of Embodiment 1, for example, are disposed at an electrical angular pitch of 120° from each other as shown in FIG. 2 and wound for a number of laps to form a lamination, and then the resulting block-shaped winding 14 is installed in the teeth 62 from outside the teeth 62. Then, the engaged portions 66 of the core back 61 are engaged by the engaging portions 64 of the teeth 62 by a method such as shrink fitting, and the wedges 15 are engaged in the wedge engaging portions 65, completing the assembly of the stator 60.

Figure 15:
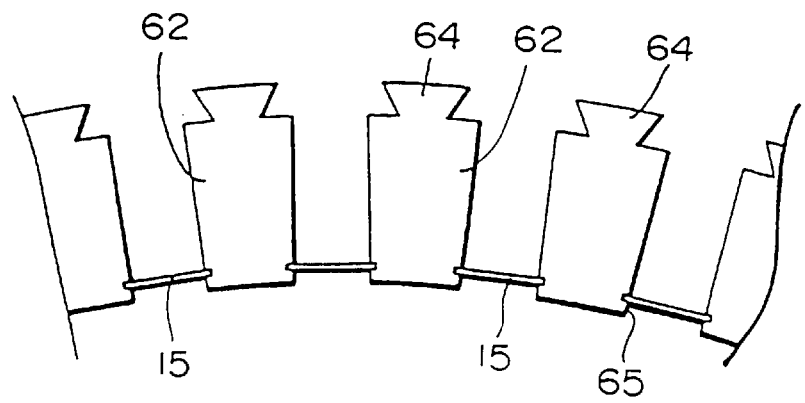
FIG. 15 is a view of an intermediate step in the manufacture of a stator for a dynamo-electric machine according to Embodiment 5 of the present invention.
Figure 16:
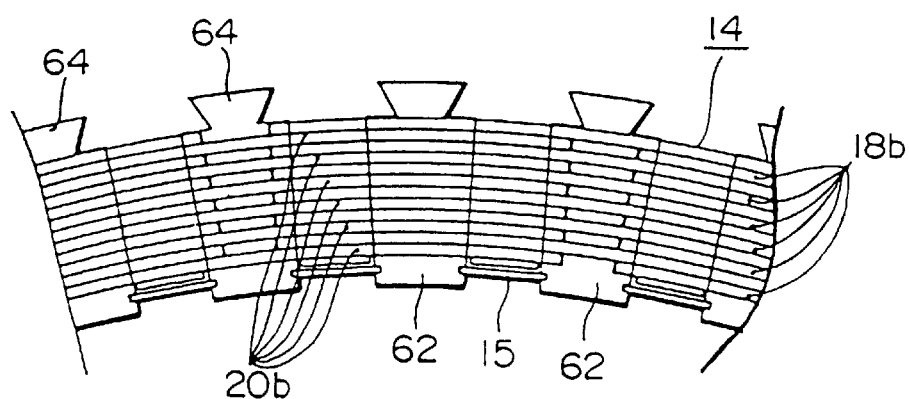
FIG. 16 is a view of an intermediate step in the manufacture of a stator for a dynamo-electric machine according to Embodiment 5 of the present invention.
Figure 17:
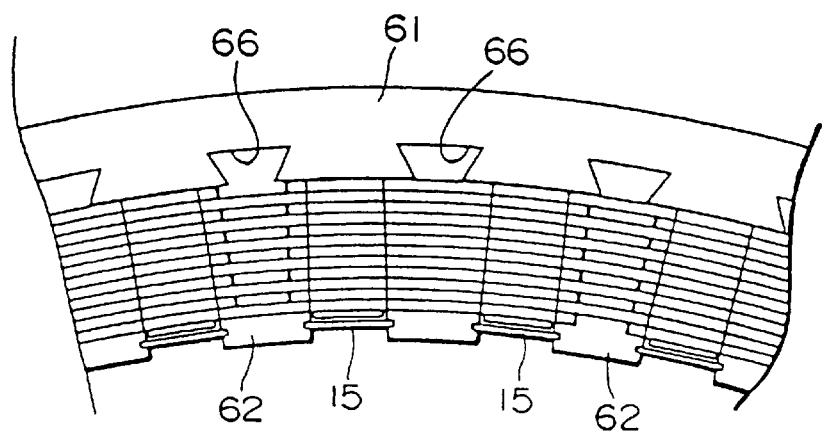
FIG. 17 is a partial end elevation of a stator for a dynamo-electric machine according to Embodiment 5 of the present invention.
Figure 18:
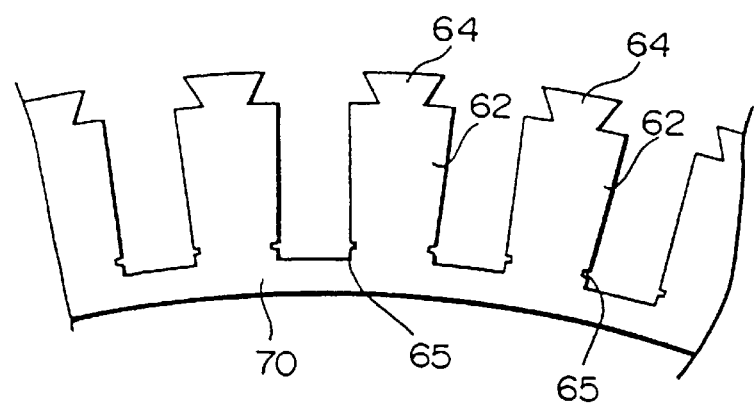
FIG. 18 is a view of an intermediate step in the manufacture of a stator for a dynamo-electric machine according to Embodiment 6 of the present invention.
Figure 19:
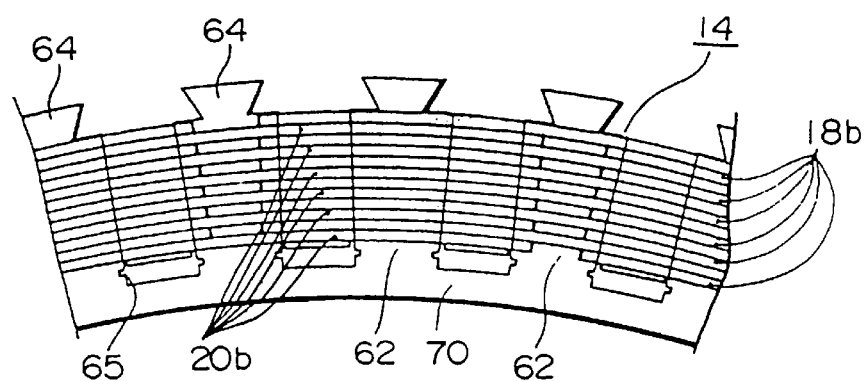
FIG. 19 is a view of an intermediate step in the manufacture of a stator for a dynamo-electric machine according to Embodiment 6 of the present invention.
Figure 20:
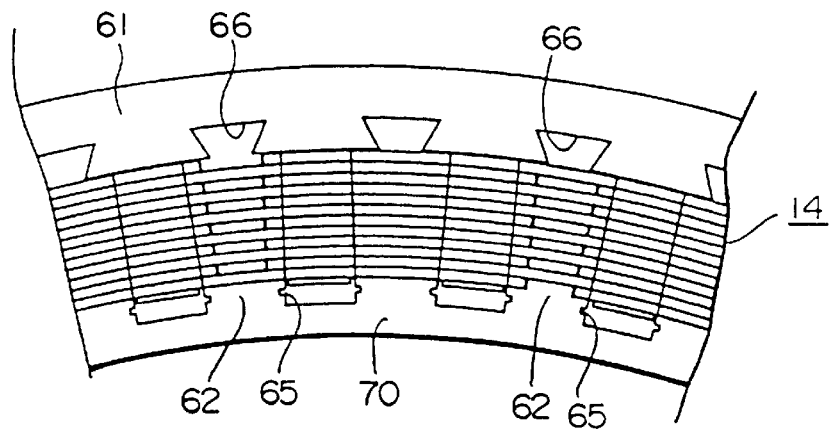
FIG. 20 is a view of an intermediate step in the manufacture of a stator for a dynamo-electric machine according to Embodiment 6 of the present invention.
Figure 21:
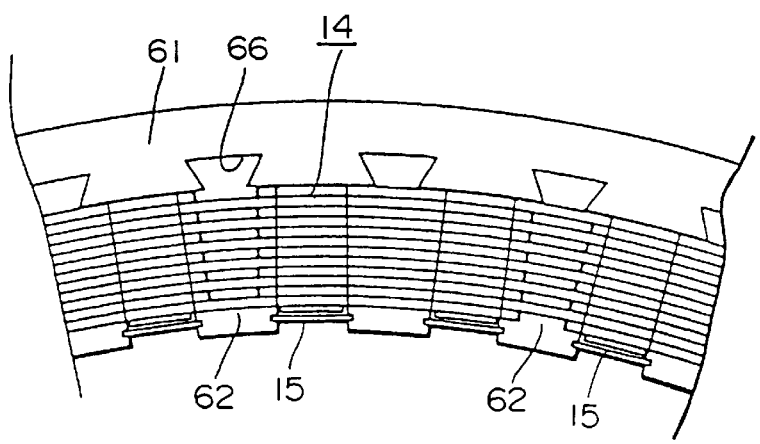
FIG. 21 is a partial end elevation of a stator for a dynamo-electric machine according to Embodiment 6 of the present invention.

Moreover, as shown in FIGS. 15 to 17, the stator 60 may also be assembled by joining the teeth 62 in advance into an annular shape by engaging the wedges 15 in the wedge engaging portions 65 and forming the block-shaped winding 14 by winding the U-phase conductor 18, the V-phase conductor 19, and the W-phase conductor 20 for a number of laps to form a lamination, then installing the resulting block-shaped winding 14 in the teeth 62 from outside the teeth 62, and thereafter engaging the engaging portions 64 of the teeth 62 in the engaged portions 66 of the core back 61 by a method such as shrink fitting.

Embodiment 6

FIGS. 18 to 21 are views of steps in the manufacture of a stator 60 for a dynamo-electric machine according to Embodiment 6 of the present invention.

In Embodiment 6, the teeth 62 are joined in advance into an annular shape by a connecting portion 70 on an inner circumferential portion. Next, the winding 14 is installed in the teeth 62 from outside the teeth 62, and the engaging portions 64 of the teeth 62 are engaged in the engaged portions 66 of the core back 61 by a method such as shrink fitting, then the connecting portion 70 is cut, and thereafter the wedges 15 are engaged in the wedge engaging portions 65, completing the assembly of the stator 60.

Moreover, the wedges 15 may also be engaged in the wedge engaging portions 65 before cutting the connecting portion 70. Furthermore, dovetailed protrusions may also be formed in the core back and grooves for engagement by these protrusions may be formed in the teeth.

Embodiment 7

Figure 22:
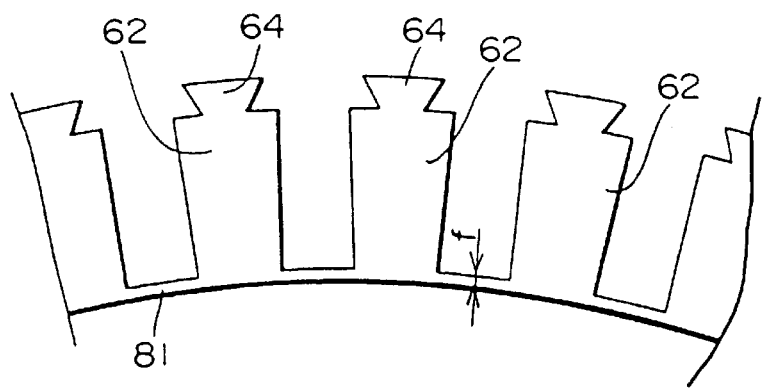
FIG. 22 is a view of an intermediate step in the manufacture of a stator for a dynamo-electric machine according to Embodiment 7 of the present invention.
Figure 23:
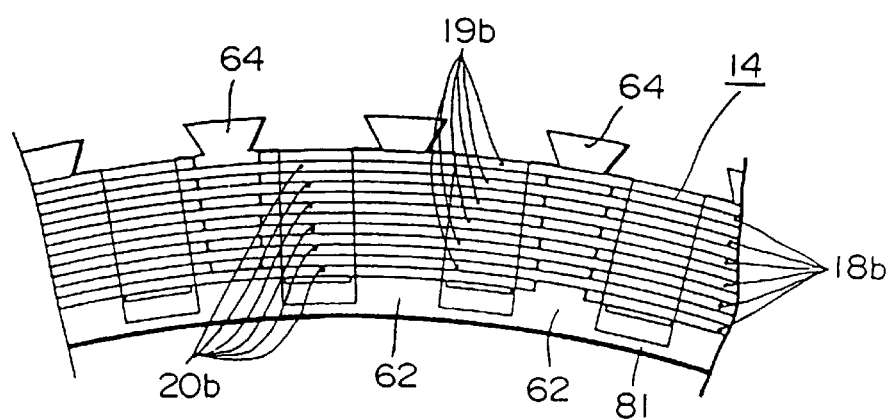
FIG. 23 is a view of an intermediate step in the manufacture of a stator for a dynamo-electric machine according to Embodiment 7 of the present invention.
Figure 24:
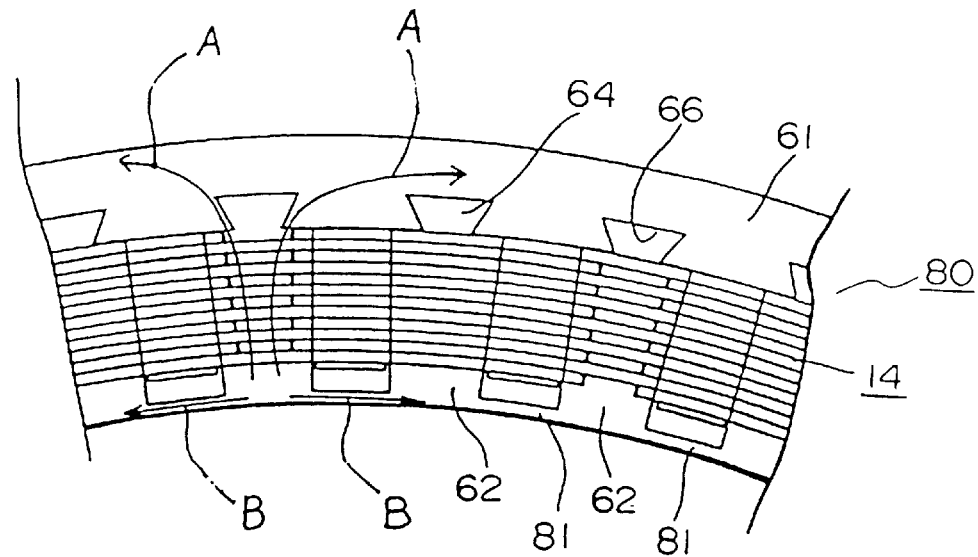
FIG. 24 is a partial end elevation of a stator for a dynamo-electric machine according to Embodiment 7 of the present invention.
Figure 25:
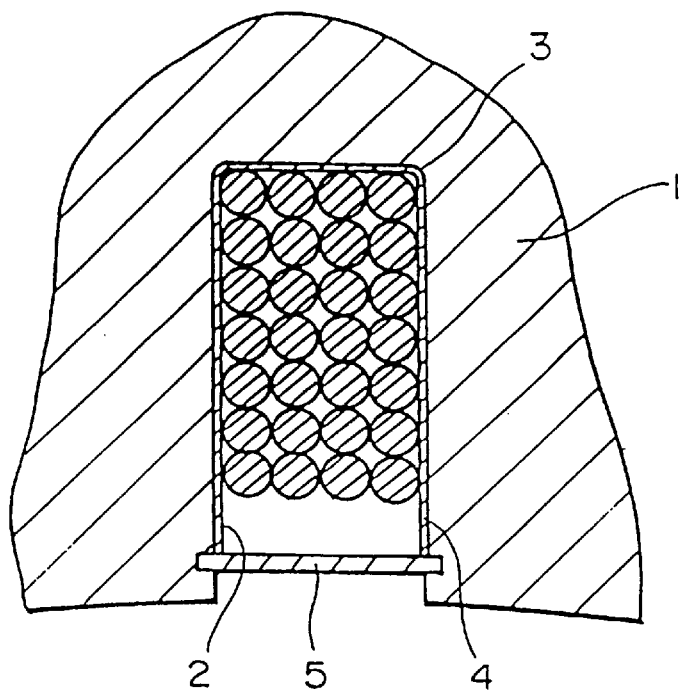
FIG. 25 is a partial cross section of a conventional stator for a dynamo-electric machine.

FIGS. 22 to 24 are views of steps in the manufacture of a stator 80 for a dynamo-electric machine according to Embodiment 7 of the present invention.

In Embodiment 7, each of the teeth 62 are joined into an annular shape by a thin connecting portion 81 on a radially inner portion. Then, the winding 14 is installed in the teeth 62 from outside the teeth 62, and the engaging portions 64 of the teeth 62 are engaged in the engaged portions 66 of the core back 61 by a method such as shrink fitting, completing the assembly of the stator 80.

The connecting portion 81 is made thin so that it is easily saturated magnetically, making it possible to ensure effectively linked magnetic flux in the direction of arrows A without increasing flux leakage in the direction of arrows B.

Moreover, each of the above embodiments has been explained with reference to a three-phase dynamo-electric machine, but the present invention may also be applied to a single-phase dynamo-electric machine, or to a polyphase dynamo-electric machine with five or seven phases, for example.

As explained above, the stator for a dynamo-electric machine according to one aspect of the present invention comprises a winding including a conductor having a rectangular cross-sectional shape in a direction perpendicular to an axial direction, an overall shape of the conductor being a crank shape when flattened out, the conductor comprising: straight portions laminated within slots; and bridge portions connecting the straight portions to each other, the bridge portions protruding from both end surfaces of the stator core in the axial direction. Therefore, the space factor of the conductor can be increased and manufacturing performance is improved.

According to one form of the stator for a dynamo-electric machine, spacing between the straight portions of the conductor may be made different in each layer so that the straight portions can be installed in the slots when the conductor is wound into multiple layers in a circumferential direction around the stator core. Therefore, the straight portions can be installed in the slots smoothly.

According to another form of the stator for a dynamo-electric machine, a cross-sectional area of the straight portions may be substantially equal to a cross-sectional area of the bridge portions. Therefore, generation of heat due to discontinuities in the cross-sectional shape between the straight portion and the bridge portion is suppressed.

According to still another form of the stator for a dynamo-electric machine, a cross-sectional area of a tapered portion between the straight portions and the bridge portions may be substantially equal to the cross-sectional area of the straight portions and the cross-sectional area of the bridge portions. Therefore, local generation of heat in the tapered portion is suppressed.

According to another form of the stator for a dynamo-electric machine, a bottom surface of the slots may be a flat surface; and a surface of the conductor opposite the flat surface may be also a flat surface. Therefore, the straight portions are housed in the slots without waste, improving the space factor of the conductor.

According to still another form of the stator for a dynamo-electric machine, the conductor may be a polyphase conductor of a polyphase dynamo-electric machine; and phases of the polyphase conductor may be disposed in laminations at a predetermined electrical angular pitch from each other. Therefore, an electrically stable dynamo-electric machine can be obtained.

According to another form of the stator for a dynamo-electric machine, the conductor may be a three-phase conductor; and a U-phase conductor, a V-phase conductor, and a W-phase conductor may be disposed in laminations at an electrical angular pitch of 120° from each other. Therefore, an electrically stable dynamo-electric machine can be obtained.

According to still another form of the stator for a dynamo-electric machine, a laminating order of bridge portions of the U-phase conductor, the V-phase conductor, and the W-phase conductor may be different from a laminating order of adjacent bridge portions of the U-phase conductor, the V-phase conductor, the W-phase conductor. Therefore, variations in resistance values due to skin effect are averaged out over the total length of the U-phase conductor, the V-phase conductor, and the W-phase conductor such that substantially the same amount of electric current flows in each conductor.

According to another form of the stator for a dynamo-electric machine, the winding may comprise: a first parallel circuit comprising an inner coil and an outer coil disposed radially outside the inner coil, each being formed by winding the conductor a predetermined number of times; and a second parallel circuit comprising an inner coil and an outer coil disposed radially outside the inner coil, each being formed by winding the conductor a predetermined number of times, the inner coil of the first parallel circuit and the outer coil of the second parallel circuit being connected in series, and the outer coil of the first parallel circuit and the inner coil of the second parallel circuit being connected in series. Therefore, variations in resistance values due to skin effect are averaged out over the total length such that substantially the same amount of electric current flows in each conductor.

According to still another form of the stator for a dynamo-electric machine, three surfaces of the conductor may be covered by an insulation sheet. Therefore, insulation between the conductor and the stator core is ensured by the insulation sheet, eliminating the need to purposely dispose an insulation coating on an inner wall of the slots.

According to another form of the stator for a dynamo-electric machine, a curved surface portion may be formed on a corner portion of the straight portions of the conductor. Therefore, the straight portions are installed in the slots smoothly.

According to still another form of the stator for a dynamo-electric machine, the stator core may comprise: an annular core back having engaged portions formed so as to be spaced around an inner circumferential portion of the core back; and teeth having engaging portions for engaging the engaged portions and forming the slots. Therefore, the block-shaped winding can be installed as a whole in the teeth, improving assembly efficiency.

According to still another form of the stator for a dynamo-electric machine, the stator core may comprise: an annular core back having engaged portions formed so as to be spaced around an inner circumferential portion of the core back; and teeth having engaging portions for engaging the engaged portions and forming the slots, the teeth being joined into an annular shape by means of a thin connecting portion at a radially inner portion. Therefore, the block-shaped winding can be installed as a whole in the teeth which are joined into an annular shape, improving assembly efficiency.

According to another aspect of the present invention, a method for manufacturing a stator for a dynamo-electric machine comprises: a step of joining the teeth into an annular shape by engaging the wedges in the entrance portions of the slots; a step of installing in the teeth a block-shaped winding formed by lamination by winding the conductor for a number of laps; and a step of engaging the engaging portions of the teeth in the engaged portions of the core back. Therefore, the block-shaped winding can be installed as a whole in the teeth, improving assembly efficiency.

According to still another aspect of the present invention, a method for manufacturing a stator for a dynamo-electric machine comprises: a step of installing in the teeth a block-shaped winding formed by lamination by winding the conductor for a number of laps, the teeth being joined in advance into an annular shape by means of a thin connecting portion at a radially inner portion; a step of engaging the engaging portions of the teeth in the engaged portions of the core back; and a step of cutting the connecting portions. Therefore the block-shaped winding can be installed as a whole in the teeth, improving assembly efficiency.

What is claimed is:

1. A method for manufacturing a stator for a dynamo-electric machine, said stator for a dynamo-electric machine comprising: a stator core constructed by laminating steel plate, said stator core being formed with slots which extend in an axial direction, said slots being spaced in a circumferential direction around said stator core; a winding disposed in said slots; wedges disposed in entrance portions of said slots, said wedges preventing said winding from protruding radially inwards from said slots, said stator core comprising: an annular core back having engaged portions formed so as to be spaced around an inner circumferential portion of said core back; and teeth having engaging portions for engaging said engaged portions and forming said slots, said winding comprising a conductor having an overall shape being a crank shape when flattened out, said conductor comprising: straight portions laminated within said slots; and bridge portions connecting said straight portions to each other, said bridge portions protruding from both end surfaces of said stator core in said axial direction, said method for manufacturing a stator for a dynamo-electric machine comprising:
a step of joining said teeth into an annular shape by engaging said wedges in said entrance portions of said slots;
a step of installing in said teeth a block-shaped winding formed by lamination by winding said conductor for a number of laps;
a step of engaging said engaging portions of said teeth in said engaged portions of said core back; and
a step of disposing the wedges in entrance portions of said slots.

* * * * *